Jan. 22, 1957   R. A. PALMER ET AL   2,778,912
TOASTING APPARATUS
Filed July 19, 1954   2 Sheets-Sheet 1
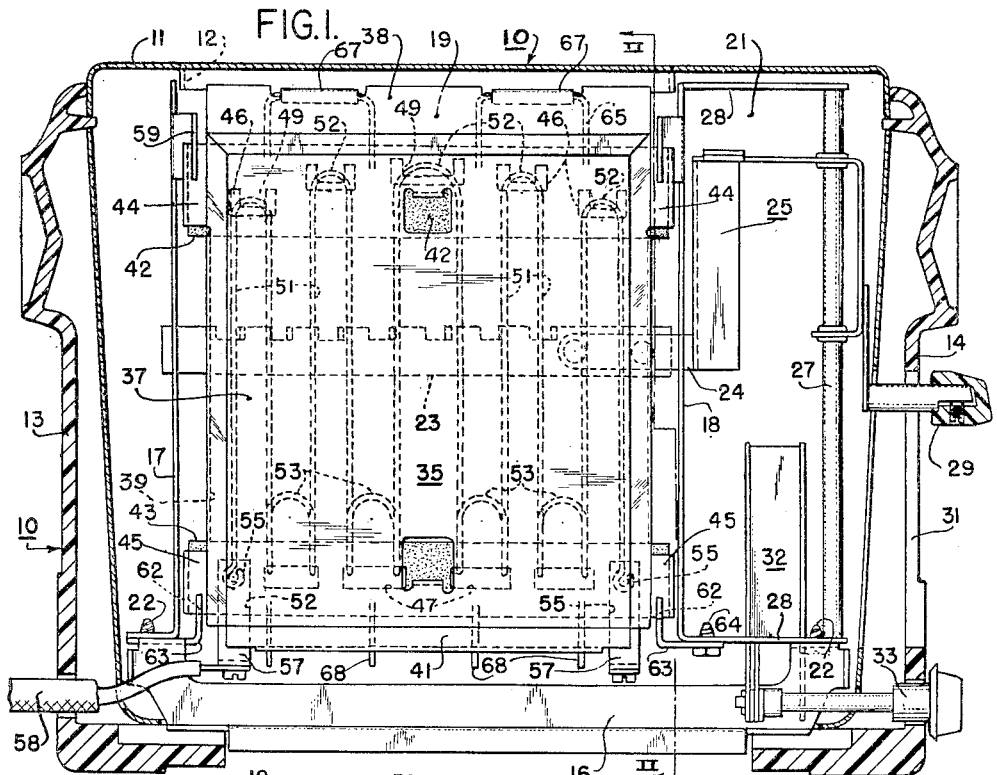
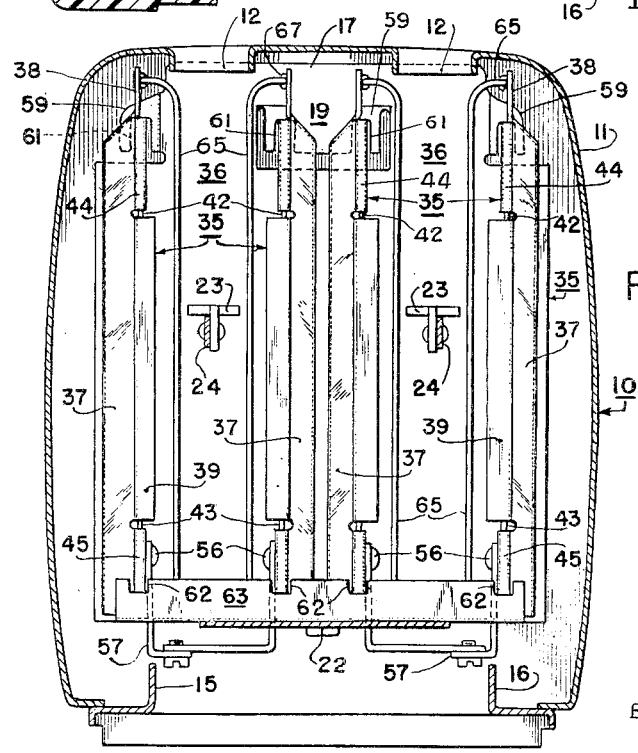
INVENTORS
HARRY H. BARKER
JAMES R. CHIVERS
REED A. PALMER
BY
ATTORNEY Jan. 22, 1957   R. A. PALMER ET AL   2,778,912
TOASTING APPARATUS
Filed July 19, 1954   2 Sheets-Sheet 2
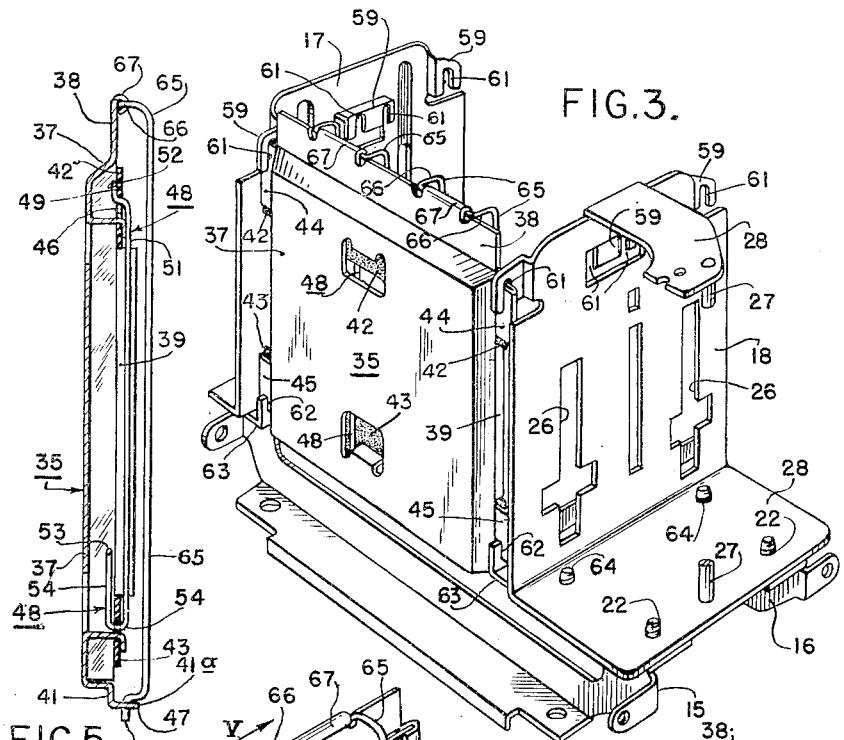
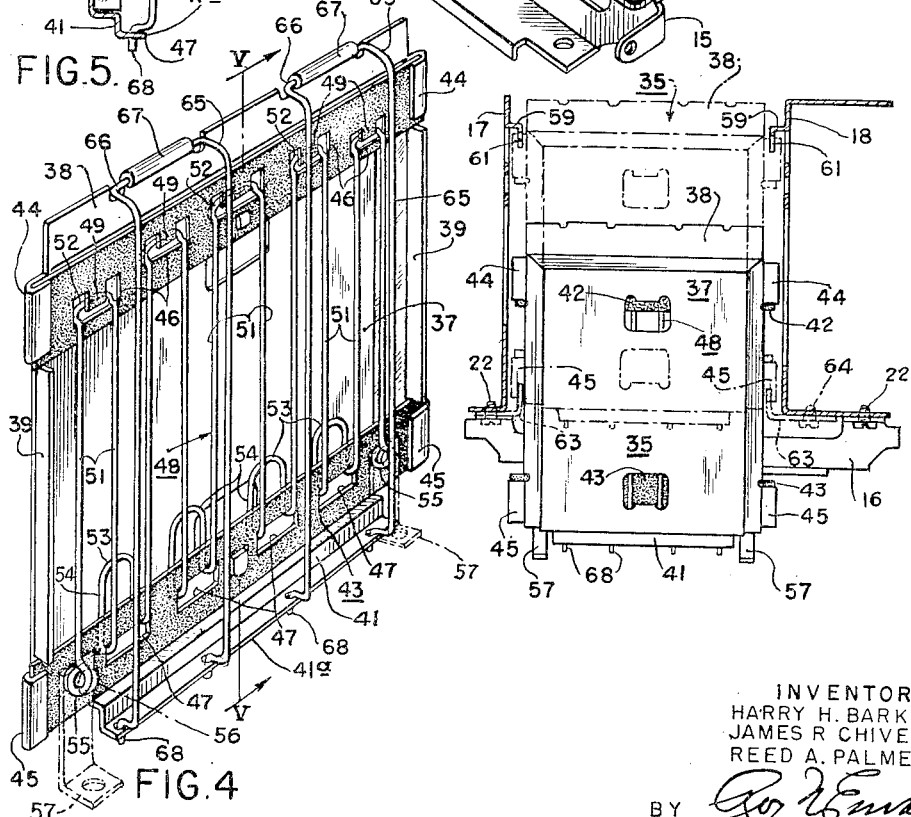
INVENTORS
HARRY H. BARKER
JAMES R CHIVERS
REED A. PALMER
BY
ATTORNEY United States Patent Office 2,778,912
Patented Jan. 22, 1957

2,778,912

TOASTING APPARATUS

Reed A. Palmer, Mansfield, Harry H. Barker, Lexington, and James R. Chivers, Loudenville, Ohio, assignors to Westinghouse Electric Corporation, East Pittsburgh, Pa., a corporation of Pennsylvania Application July 19, 1954, Serial No. 444,112

4 Claims. (Cl. 219—19)

This invention relates to toasting apparatus and has for an object to provide improved apparatus of this kind.

A further object of the invention is to provide an improved heater and heat reflecting structure for a toaster which may be readily constructed as a unit for assembly to the toaster casing.

In practicing the invention, a heat reflector, generally coextensive with the length and height of the toasting space is suitably formed to support a pair of insulating strips spaced apart for the support of a heater. The strips have respective series of openings formed therein, in which openings a convoluted heater of relatively stiff wire is inserted and the terminals of the heater wire are secured to one of the strips. After the securing of the strips to the reflector which may be of relatively thin sheet metal and the securing of the several convolutions of the heater to the strips, a rigid unit is provided. This unit may be completely processed and tested prior to its assembly to the toaster structure. Preferably, the guard wires of the toaster are secured to the reflector and define elements of the heater unit. After completion of the unit, assembly of the same to the toaster casing may be carried out in any suitable manner for providing one or more toasting wells in which the bread slices are disposed for toasting. Uniform heat distribution may be effected by varying the length of the various convolutions of the heater depending upon the design of the toaster structure.

The foregoing and other objects are effected by the invention as will be apparent from the following description taken in connection with the accompanying drawings, forming a part of this application, in which:

Fig. 1 is a longitudinal section taken through a toaster constructed and arranged in accordance with the invention;

Fig. 2 is a transverse section as viewed from the line II—II of Fig. 1;

Fig. 3 is a perspective of a portion of the structure shown in Figs. 1 and 2;

Fig. 4 is a perspective of an assembled heating unit shown in Fig. 1;

Fig. 5 is a section taken along the line V—V of Fig. 4; and

Fig 6 is a view showing a portion of the chassis of the toaster and the assembly of a heating unit thereto.

Reference will now be had to the drawings wherein the invention is shown applied to a two slice toaster of the so-called "pop-up" type. It is pointed out here that only the elements of the toaster which are material to an understanding of the invention are shown in detail in the interest of brevity and clarity and, in this connection, the means for timing the toasting operation and actuating the slice support to its nontoasting position are only referred to, generally. Also, the switching means for controlling energization of the heaters is not shown. It will be understood that these means may be of any suitable construction.

In the embodiment of the invention shown in the drawings, a casing 10 is provided including a shell 11 of inverted U-shape and having a pair of slice openings 12 formed in the upper side thereof. The casing further includes end covers 13 and 14 and a pair of rails 15 and 16 extending longitudinally of the casing at the bottom thereof. The construction of the rails 15 and 16 is best shown in Fig. 3. It will be understood that the shell 11, the end covers 13 and 14 and the rails 15 and 16 may be secured together in any suitable manner.

Arranged within the casing 10 and transversely thereof and a pair of partitions 17 and 18 for dividing the space within the casing into a toasting chamber 19 and a compartment 21 for the operating mechanism of the toaster. The partitions 17—18 are carried by the rails 15—16 and secured thereto, for example, by self tapping screws 22. Slice carriers 23 for the support of the bread to be toasted are arranged in the toasting chamber 19 below the slice openings 12. The carriers 23 are substantially co-extensive with the length of the toasting chamber 19 and are supported by arms 24 forming a part of a carriage 25. The arms 24 project through elongated slots 26 formed in the partition 18. The carriage 25 is supported, slidably, upon a vertical rod 27 fixed at its ends to horizontal members 28 of the partition 18. It will be understood that the carriage 25 and slice carriers 23 are movable between an upper, inactive or slice receiving position and a lower toasting position. A handle 29 secured to the carriage 25 extends through a slot 31 formed in the end cover 14 for manual actuation of the carriage from the upper position, as shown, to a lower toasting position.

As is generally understood, the carriage 25 is retained in toasting position by a suitable mechanism and is automatically returned to its upper position after a period of time determined by a timer indicated generally at 32. For reasons set forth above, the actuating means for the carriage and the timing means 32 are not shown in detail. An adjusting shaft 33 extending through a suitable opening in the end cover 14 may be employed for adjusting the timer 32 for different periods of toasting as is well understood.

In accordance with the invention, an improved heating and heat reflecting unit for the toaster is provided. The units, indicated generally at 35, are supported as explained hereinafter on each side of the bread carriers 23 and define toasting wells 36 within which the carriers 23 move during a toasting operation. The units 35 are substantially similar in construction and include a heat reflector 37 generally coextensive with the length and height of the toasting chamber 19. The reflector 37 dished, as shown best in Fig. 5, includes a flange member 38 extending upwardly from the upper margin thereof and laterally spaced flanges 39 arranged in vertical planes on its opposite sides. The bottom margin of the reflector 37 is provided with an angular flange 41 having a horizontally extending portion 42.

The units 35 have vertically spaced insulating strips 42 and 43 formed of heat resisting material such as, for example, mica. The upper and lower strips 42 and 43 are positioned by the ends of the flanges 39 and are aligned, substantially, in a common vertical plane. Preferably the strips are held by reverse bent projections 44 and 45 extending outwardly from the sides of the reflector 37, as clearly shown in Fig. 4. The strips 42 and 43 have respective series of openings 46 and 47 for the reception of a heater wire 48. As shown, the upper openings 46 are generally U-shape because of a downwardly extending projection 49 in each opening, while the lower openings 47 are rectangular. The heater wire 48 includes parallel main portions 51 and bends connecting the adjacent ends of the portions 51 so as to define a convoluted structure as shown in Fig. 4. The upper bends, shown at 52, are offset from the plane of the portions 51 (see Fig. 5) and extend through the openings 46 and to the rear of the projections 49. The lower bends, indicated at 53, connect hooked ends 54 of the heater portions 48, which ends 54 are threaded through the openings 47 as shown best in Fig. 4.

The ends of the heater wire 48, indicated at 55, are secured in any suitable manner to the strip 43 such as, for example, by rivets 56. In this connection, the rivets 56 may also be employed for securing bus bars 57 to the terminals 55 of the heater wire 48. It will be understood that the terminals 55 may be connected by the bus bars 57 in any desired manner to provide series or parallel connections of the heaters 48. Furthermore, the bus bars 57 serve to connect the heaters 48 to a service cord 58 of conventional construction. It is understood, that some form of line switch (not shown) is employed for energizing the heater wires 48 in the lower position of the carriage 25. For reasons set forth heretofore the line switch is not disclosed.

From the description which has preceded, it will be apparent that the reflector 37, the heater wire 48 and its supporting strips 42 and 43 may be fabricated and tested as a unit prior to the assembly thereof to the toaster casing structure. Accordingly, the cost of the toaster is reduced and the manufacture facilitated. The support for the top of the completed unit in the toaster is provided by ears 59 formed on the partitions 17 and 18, each of the ears 59 being provided with downwardly facing slots 61 in which the upper side of the units 35 is fitted. In the embodiment shown, the turned over projections 44 are seated in the slots 61 for the positioning of the upper portion of the units 35. The lower projections 45 are seated in upwardly facing slots 62 provided in clips 63, the latter being secured to the partitions 17 and 18. As shown, the clip 63 at one end of the toaster is secured to the partition 17 by the self tapping screws 22 while the clip 63 at the opposite end is secured to the horizontal member 28 by screws 64.

While the usual guard wires of the toaster may be carried in any suitable manner, it is preferred that they be made a part of the unit 35. As shown, the guard wires indicated at 65 are formed in pairs bent to form four guards. The bends 66 intermediate the ends of the guards wires 65 are secured in rolled over extensions 67 formed on the flange 38 and the lower ends 68 of the guard wires 65 are sprung in suitable openings in the flange 42.

In Fig. 6 the assembly of a completed unit 35 to the toaster is shown. The position of the unit 35 shown in full lines is an intermediate position in the assembly before the unit is positioned in the slots 61 and the broken lines show the unit in its assembled position. It will be understood that the clips 63 are attached after the unit is in its final or assembled position.

The distribution of heat in the toasting wells may be varied depending upon the design of the toaster by varying the relative length of the various convolutions of the heater wire. As shown, the center convolution is longer in the illustrated embodiment and the lengths of the convolutions become progressively shorter toward the outside or end convolutions. Accordingly, more heat is radiated toward the slice being treated at its center than adjacent its ends. Furthermore, an increase in the amount of radiated heat at the bottom of the slice where it is usually needed is provided by the turned up hook portions 54 of the heater. More or less heat at this bottom location may be readily obtained by increasing or reducing the length of the hook portions.

From the foregoing description, it will be apparent that an improved heating and reflecting unit is provided in accordance with this invention which, as set forth, may be readily manufactured and tested prior to its assembly in the toaster. Furthermore, a saving in cost over conventional present day structures is provided. In this connection, it is pointed out that a substantial reduction in the amount of mica, now difficult to obtain in acceptable quality, is effected when compared to conventional constructions.

While the invention has been shown in but one form, it will be obvious to those skilled in the art that it is not so limited, but is susceptible of various changes and modifications without departing from the spirit thereof.

What is claimed is:

1. In a toaster, the combination of a casing structure enclosing a chamber, a pair of toasting units disposed within said chamber and defining a toasting well therein, each of said units including a heat reflecting plate, a plurality of generally vertical guard wires, horizontally spaced and secured to said plate, a pair of vertically spaced insulating strips secured to the reflector plate and having, respectively, a series of openings formed therein and a heater convoluted of relatively stiff wire to form a plurality of generally vertical, parallel main heating portions and upper and lower bends connecting adjacent ends of said heating portions; the bends at one end of the heating portions being offset to extend through the respective openings of one of said strips and the opposite bends defining hooks threaded respectively through the openings of the other of said strips, said heater being pre-formed before its insertion as a unit in said openings and means securing the toasting units to the casing structure.

2. In a toaster, the combination of a casing structure enclosing a chamber, a pair of toasting units disposed within said chamber and defining a toasting well therein; each of said units including a heat reflecting plate, a plurality of generally vertical guard wires, horizontally spaced and secured to said plate, a pair of vertically spaced insulating strips secured to the reflector plate and having, respectively, a series of openings formed therein, each of the openings in one of said strips having respective tongues projecting from the strip into the opening, a heater convoluted of stiff wire to form a plurality of generally vertical parallel main heating portions and upper and lower bends connecting adjacent ends of said heating portions, the bends at one end of the heating portions being offset to extend through the respective openings of said one strip and around the tongues projecting therein and the opposite bends defining hooks threaded respectively through the openings of the other of said strips, said heater being pre-formed before its insertion as a unit in said openings and means for securing the terminals of said heater wire to said other strip; and means attaching the toasting units to the casing structure.

3. In a toaster, the combination of a casing structure enclosing a chamber, a pair of toasting units spaced apart within the chamber and defining a toasting well therein, each of said units including a heat reflecting plate, spaced upper and lower insulating strips supported solely by the plate and each having a plurality of openings spaced longitudinally therein, a pre-formed heater convoluted of stiff wire and having respective portions inserted in said openings from one side of the strips, the vertical spacing of the openings in the upper and lower strips and the length of the convolutions of the wire increasing progressively from the ends of the strips to the center thereof and a plurality of horizontally spaced, vertically extending guard wires secured to the plate and supported solely thereby, and means for attaching the toasting units to the casing structure.

4. In a toaster, the combination of a casing structure enclosing a chamber, a pair of toasting units disposed within said chamber and defining a toasting well therein, each of said units including a heat reflecting plate, a pair of vertically spaced insulating strips secured to the reflector plate and having, respectively, a series of openings formed therein and a heater convoluted of relatively stiff wire to form a plurality of generally vertical, parallel main heating portions and upper and lower bends connecting adjacent ends of said heating portions; the bends at one end of the heating portions being offset to extend through the respective openings of one of said strips and the opposite bends defining hooks threaded respectively through the openings of the other of said strips, said heater being preformed before its insertion as a unit in said openings, and means securing the toasting units to the casing structure.

References Cited in the file of this patent

UNITED STATES PATENTS

| | | |
|---|---|---|
| 2,419,184 | Young | Apr. 15, 1947 |
| 2,419,355 | Koci | Apr. 22, 1947 |
| 2,598,592 | Olson et al. | May 27, 1952 |
| 2,599,038 | Aske | June 3, 1952 |
| 2,685,633 | Olson et al. | Aug. 3, 1954 |